US008442277B1

(12) United States Patent
Newman et al.

(10) Patent No.: US 8,442,277 B1
(45) Date of Patent: May 14, 2013

(54) IDENTITY AUTHENTICATION SYSTEM FOR CONTROLLING EGRESS OF AN INDIVIDUAL VISITING A FACILITY

(75) Inventors: Kurt D. Newman, Matthews, NC (US); Timothy J. Bendel, Charlotte, NC (US); David Joa, Pacifica, CA (US); Debashis Ghosh, Charlotte, NC (US); Michael J. O'Hagan, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1063 days.

(21) Appl. No.: 12/262,327

(22) Filed: Oct. 31, 2008

(51) Int. Cl.
*G06K 9/00* (2006.01)

(52) U.S. Cl.
USPC .......................................................... 382/117

(58) Field of Classification Search ........................ None
See application file for complete search history.

(56) References Cited

U.S. PATENT DOCUMENTS

| | | | | |
|---|---|---|---|---|
| 5,423,574 A * | 6/1995 | Forte-Pathroff | ................. | 283/75 |
| 5,978,493 A * | 11/1999 | Kravitz et al. | ................. | 382/115 |
| 6,714,665 B1 * | 3/2004 | Hanna et al. | ................... | 382/117 |
| 6,801,640 B1 * | 10/2004 | Okubo et al. | .................. | 382/118 |
| 7,164,354 B1 * | 1/2007 | Panzer | ..................... | 340/539.15 |
| 7,365,643 B1 * | 4/2008 | Cole | .......................... | 340/539.11 |
| 2001/0030607 A1 * | 10/2001 | Osborne et al. | ............ | 340/573.4 |
| 2003/0156740 A1 * | 8/2003 | Siegel et al. | ................... | 382/115 |
| 2006/0274918 A1 * | 12/2006 | Amantea et al. | .............. | 382/117 |
| 2008/0075334 A1 * | 3/2008 | Determan et al. | ............ | 382/117 |
| 2009/0048936 A1 * | 2/2009 | Lerch et al. | ...................... | 705/17 |
| 2009/0179417 A1 * | 7/2009 | Murra | .............................. | 283/77 |
| 2009/0245594 A1 * | 10/2009 | Abramovich et al. | ......... | 382/117 |

* cited by examiner

*Primary Examiner* — Tom Y Lu
*Assistant Examiner* — Thomas Conway
(74) *Attorney, Agent, or Firm* — Michael A. Springs; Moore & Van Allen, PLLC; Padowithz Alce

(57) ABSTRACT

Embodiments of the invention relate to systems, methods, and computer program products for authenticating the identity of an authorized custodian of a dependent individual visiting a facility. In particular, the identity of an authorized custodian of a dependent individual visiting a facility is authenticated by: recording an image of an iris of the authorized custodian in a database; capturing an image of an iris of an individual attempting to accompany the dependent individual when the dependent individual exits the facility; and verifying, prior to allowing the dependent individual to exit the facility, that the captured image of the iris of the individual attempting to accompany the dependent individual matches the recorded image of the iris of the authorized custodian.

24 Claims, 2 Drawing Sheets

IDENTITY AUTHENTICATION SYSTEM FOR CONTROLLING EGRESS OF AN INDIVIDUAL VISITING A FACILITY

FIELD

In general, embodiments of the invention relate to methods, systems and computer program products for authenticating the identity of an authorized custodian of a dependent individual visiting a facility.

BACKGROUND

There are a variety of facilities that require certain of its visitors to be accompanied by another individual when leaving the facility. A good example of this type of facility is a daycare center, where the management of the day care center requires that a parent or other pre-approved adult picks up the child at the end of a day spent at the center. Other examples include certain schools, facilities for individuals with mental or physical disabilities, hospitals and other health care or medical facilities, senior centers, youth detention centers, etc. Some of these facilities may have implemented security processes designed to ensure that the individual arriving to pick up the dependent visitor to the facility is authorized to do so. However, even where the management of the facility is diligent in taking particular security precautions in releasing dependent visitors into the custody of other individuals, those precautions may still be circumvented by an unauthorized individual that lies to the management personnel, obtains necessary documentation through inappropriate means in order to pose as an authorized custodian, generates and presents false documentation, or otherwise employs tactics designed to subvert the security requirements put in place by the facility. There therefore remains a need for a security system that can be employed by such facilities that is able to positively determine that a particular individual is an authorized custodian for a dependent visitor prior to releasing the dependent visitor into such individual's custody.

SUMMARY

The present invention utilizes iris recognition technology to address the failing security processes in facilities welcoming dependent individuals. Iris recognition is a method of biometric authentication that uses pattern recognition techniques in connection with high-resolution images of the irides of an individual's eyes. More particularly, an algorithm converts the image into a digital template that is a mathematical representation of the iris of the individual. Pattern recognition software is utilized in comparing the digital template to other digital templates (corresponding to other individuals' irides) stored in a database. Comparing the templates in this manner yields positive identification of an individual when a match is found. Due to the ability to obtain such unambiguous results, the relative ease and convenience of capturing iris images, the inability of an imposter to "trick" the technology, as well as countless other advantages, the present invention, in relying on iris recognition technology to authenticate the identity of an authorized individual of a dependent individual visiting a facility, is a highly valuable security process that can be implemented at many different types of facilities around the world.

Embodiments of the invention relate to systems, methods, and computer program products for authenticating the identity of an authorized custodian of a dependent individual visiting a facility. For example, the identity of an authorized custodian of a dependent individual visiting a facility is authenticated by: recording an image of an iris of the authorized custodian in a database; capturing an image of an iris of an individual attempting to accompany the dependent individual when the dependent individual exits the facility; and verifying, prior to allowing the dependent individual to exit the facility, that the captured image of the iris of the individual attempting to accompany the dependent individual matches the recorded image of the iris of the authorized custodian.

According to one embodiment, an iris recognition mechanism is utilized that is configured to locate in the database a recorded image of an iris that matches a captured image of an iris. In accordance with some embodiments, a profile of the dependent individual is stored in the database and the recorded image of the iris of the authorized custodian is correlated to the profile of the dependent individual. In one embodiment, the profile of the dependent individual includes a recorded image of an iris of the dependent individual.

In some embodiments, the process further includes capturing an image of the iris of the dependent individual prior to allowing the dependent individual to exit the facility, locating in the database a recorded image that matches the captured image of the iris of the dependent individual, and confirming that the located recorded image is the recorded image of an iris of the dependent individual contained in the profile of the dependent individual stored in the database and correlated to the recorded image of the iris of the authorized custodian.

In one embodiment, verifying that the captured image of the iris of the individual facility attempting to accompany the dependent individual when the dependent individual exits the facility matches the recorded image of the iris of the authorized custodian involves locating in the database a recorded image of an iris that matches the captured image of the iris of the individual attempting to accompany the dependent individual, and confirming that the located recorded image is correlated to a profile of the dependent individual stored in the database.

Other embodiments involve recording an image of an iris of the dependent individual, correlating the recorded image of the iris of the dependent individual to the recorded image of the authorized custodian, capturing an image of the iris of the dependent individual prior to allowing the dependent individual to exit the facility, and locating in the database a recorded image of an iris that matches the captured image of the iris of the dependent individual. In accordance with some embodiments, verifying that the captured image of the iris of the individual attempting to accompany the dependent individual when the dependent individual exits the facility matches the recorded image of the iris of the authorized custodian involves locating in the database a recorded image of an iris that matches the captured image of the iris of the individual attempting to accompany the dependent individual, and confirming that the located recorded image of an iris that matches the captured image of the iris of the individual attempting to accompany the dependent individual is correlated to the located recorded image of an iris that matches the captured image of the iris of the dependent individual.

Another embodiment of the present invention is a method for preventing a dependent individual attempting to exit a facility from exiting the facility, wherein the method includes recording an image of an iris of the dependent individual and an image of an iris of an authorized custodian of the individual in a database in such a way that the images are correlated, capturing an image of the iris of the dependent individual when the dependent individual attempts to exit the facility, locating in the database a recorded image of an iris that matches the captured image of the iris of the dependent individual, and preventing the dependent individual from exiting the facility.

In some embodiments, the method further includes determining that the dependent individual is not accompanied by the authorized custodian. And in one embodiment, it may be determined that the dependent individual is not accompanied by the authorized custodian by failing to capture an image of an individual attempting to accompany the dependent individual attempting to exit the facility.

In yet another embodiment, the method also includes capturing an image of an iris of an individual attempting to accompany the dependent individual attempting to exit the facility, locating in the database a recorded image of an iris that matches the captured image of the iris of the individual attempting to accompany the dependent individual, and determining that the located recorded image of an iris that matches the captured image of the iris of the individual attempting to accompany the dependent individual is not correlated to the located recorded image of an iris that matches the captured image of the iris of the dependent individual.

According to some embodiments, the present invention is a system for authenticating the identity of an authorized custodian of a dependent individual visiting a facility, including the following components: an iris scanning device configured to capture at least one image of an individual's iris, an exit management system in communication with the iris scanning device and comprising an iris recognition mechanism, and a database in communication with the exit management system and configured to store an image of an iris of the authorized custodian in correlation to an image of the dependent individual.

In one embodiment, the exit management system further comprises a user interface that allows a user to access the database and store data in the database. In another embodiment, the iris scanning device comprises an imaging device configured to capture high-resolution images of the irides of an individual's eyes. The iris scanning device may be further configured to take a photograph of an individual showing the entire face of the individual.

In some embodiments, the iris scanning device is in communication with the database and is configured to transmit the images that it captures to the exit management system and/or the database. In one embodiment, the exit management system may be configured to store in the database the images captured by the iris scanning device. In yet another embodiment, the exit management system is configured to correlate an image of an iris of the authorized custodian to an image of an iris of the dependent individual. And in another embodiment, the exit management system is configured to compare a captured image of an iris of an individual attempting to accompany the dependent individual exiting the facility to images stored in the database.

Another embodiment of the present invention is a computer program product for authenticating the identity of an authorized custodian of a dependent individual visiting a facility, the computer program product comprising a computer readable medium having computer readable program instructions stored therein. In one embodiment the computer-readable program instructions comprise four instructions. The first instructions are configured for recording an image of an iris of the dependent individual in a database, the second instructions are configured for recording an image of an iris of the authorized custodian in the database, the third instructions are configured for correlating in the database the recorded image of the iris of the dependent individual to the recorded image of the iris of the authorized custodian, and the fourth instructions configured for comparing a captured image of an iris of an individual attempting to accompany the dependent individual to recorded images in the database.

In one embodiment the computer program product also comprises instructions configured for locating a recorded image in the database that matches the captured image of the iris of the individual attempting to accompany the dependent individual. In another embodiment, the computer program product has additional instructions configured for verifying that the located recorded image in the database is correlated to the recorded image of the iris of the dependent individual. Finally, in yet another embodiment, the computer program product has instructions configured for utilizing an iris recognition mechanism.

BRIEF DESCRIPTION OF THE DRAWINGS

Figure 1:
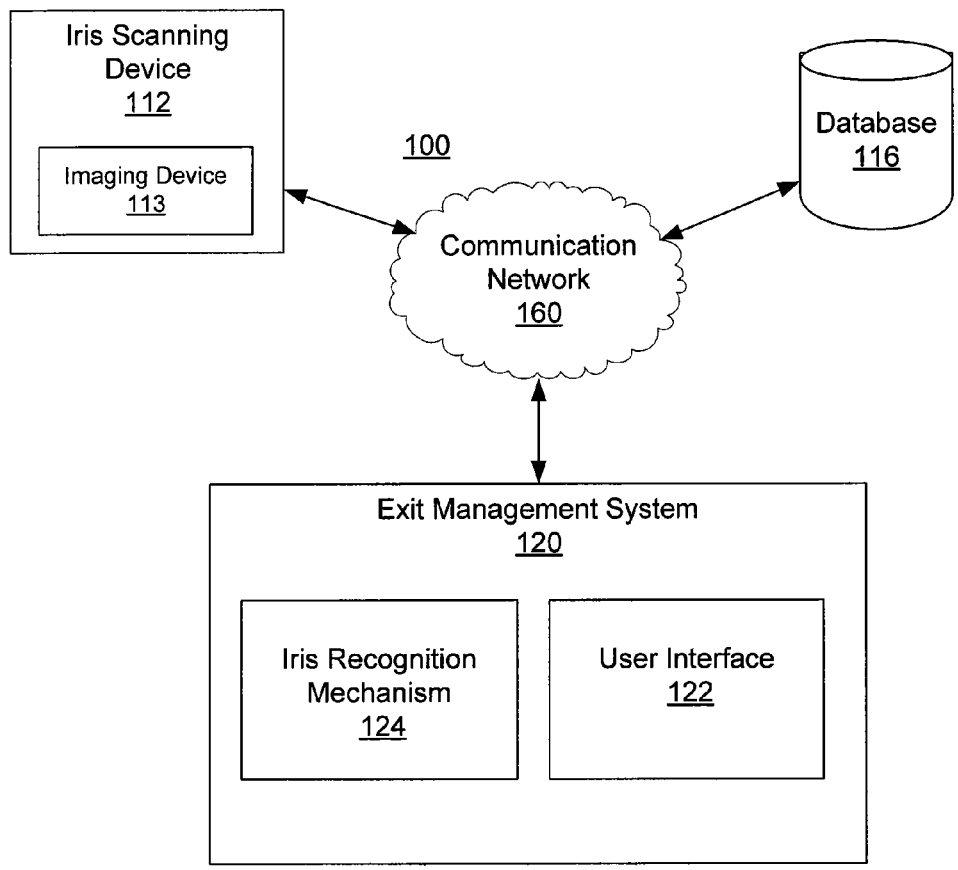
Figure 2:
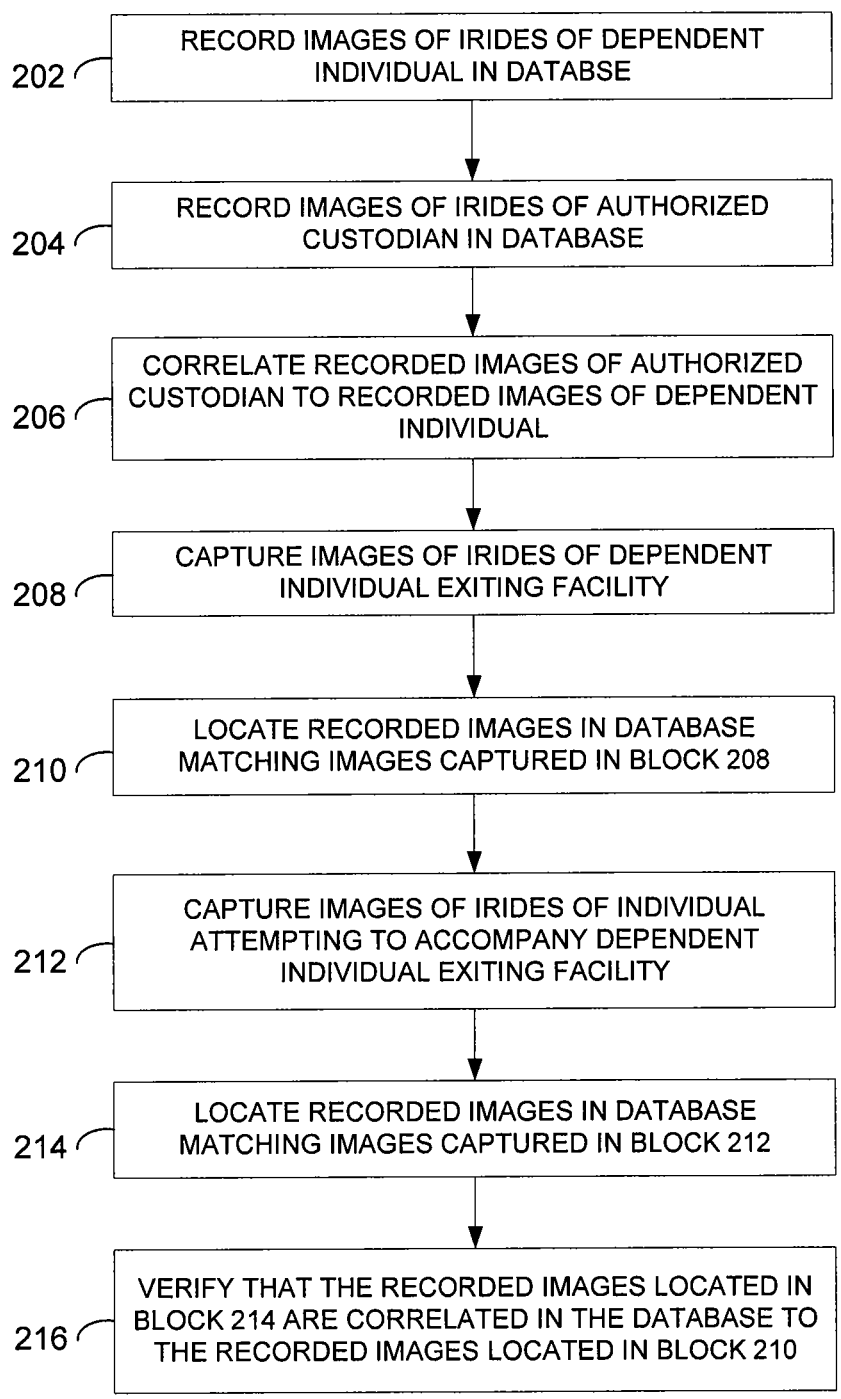

Having thus described embodiments of the invention in general terms, reference will now be made to the accompanying drawings:

FIG. 1 illustrates an environment in which the processes described herein are implemented according to one embodiment of the invention; and FIG. 2 is a flow chart illustrating an exemplary process of authenticating the identity of an authorized custodian of a dependent individual visiting a facility.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method (including a business process), system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

FIG. 1 illustrates an exemplary identity authentication system 100 in accordance with an embodiment of the invention. With regard to FIG. 2, a flow chart is provided that illustrates an exemplary procedure 200 for authenticating the identity of an authorized custodian of a dependent individual visiting a facility. As a primary matter, and in accordance with some embodiments, the system 100 and procedure 200 described herein operate within the greater environment of a facility that requires certain visitors to be accompanied by another individual when leaving the facility. In some situations, such visitors may be dependent in some way upon other individuals, and for convenience such visitors will be referred to hereinafter as "dependent individuals." However, it should be understood that it is not necessary that a dependent individual be characterized as "dependent" under any law, or that a dependent individual have or require a legal guardian, custodian, etc. Indeed, a "dependent individual," as that term is used herein, may not even be an individual who is customarily thought of as "dependent," and may be an individual who, outside of the particular facility she is visiting, and perhaps even outside of the specific visit she is making to the facility, is considered, legally and otherwise, to be a self-sufficient individual capable of caring and making decisions for herself. As such, it should be clear that the term "dependent individual" does not connote a requirement that the individual visiting the facility be incapacitated, a minor, or otherwise incapable of acting for herself; it merely means that the individual is subject to a requirement imposed by the facility that the individual be accompanied by another individual when exiting the facility. By way of example, environments in which the identity authentication system 100 may operate include day care facilities, schools, nursing homes, hospitals, psychiatric and behavioral health facilities, other medical facilities, detention centers and prisons, and any other facility having a need for authenticating the identity of an individual accompanying a dependent individual exiting the facility.

With regard to the particular components of the system 100, and in accordance with one embodiment of the present invention, an iris scanning device 112, a database 116, and an exit management system 120 are in communication over a communication network 160. The communication network 160 could be a wide area network, including the Internet, a local area network or intranet, a wireless network, etc. It should be understood that when two components are described herein as communicating over a network, the components may be directly coupled to each other or indirectly coupled via one or more other components. Furthermore, although the system is described herein as comprising several unique components, these components need not be separate and distinct from one another, and two or more of such components may, in some embodiments, be combined into a single component that performs all of the functions of the multiple components so combined as described herein.

Turning to the iris scanning device 112, in some embodiments the iris scanning device 112 comprises an imaging device 113, such as a camera, and is configured to capture high-resolution images of the irides of an individual's eyes. When the procedure 200 provides for images of an individual's irides to be captured, it should be understood that the individual whose irides are being scanned may cooperate with the iris scanning process, for example by standing still and staring into the imaging device 113 to allow the iris scanning device 112 to capture the images, or the images may be captured covertly, whereby the individual is unaware that the iris scanning device 112 is capturing the images. Additionally, the iris scanning device 112 may take only one image of one iris of the individual that it is scanning, or it may take multiple images of one iris or both irides of the individual. In accordance with one embodiment of the present invention, the iris scanning device 112 is further configured to transmit the captured images to the database 116, to the exit management system 120, or both.

According to some embodiments, a dependent individual is admitted to the facility, and the iris scanning device 112 captures high-resolution images of the dependent individual's irides. Alternatively, the exit management system 120 may obtain images of the dependent individual's irides through other sources, such as a public third party database. In accordance with either of the foregoing embodiments, and as set forth in block 202, the images of the dependent individual's irides are recorded in the database 116 so that they may be retrieved and/or accessed by the exit management system 120 in the future. According to one embodiment, the exit management system 120 comprises a user interface 122 that allows a facility exit manager to access the database 116 and enter information that may be stored in the database 116. The "exit manager" is not necessarily an employee of the facility and the functions performed by the exit manager may be performed by multiple people or may be automated. In this regard, in one embodiment the "exit manager" comprises a computing device operating computer-readable instructions for performing the functions of the exit manager described herein. According to some embodiments, the exit manager's role is to manage the entry and exit of dependent individuals to and from the facility by utilizing the user interface 122 of the exit management system 120. In particular, the exit manager may enter identifying information and other relevant information and data (as determined by the facility) about the dependent individual to be stored in the database 116 and related to the images of the dependent individual's irides.

It should be appreciated that, according to some embodiments of the invention, the identifying information of the dependent individual may be stored in the database 116 prior to capturing the images of the dependent individual's irides, or the iris images and the identifying information may be stored in the database 116 at the same time. According to one embodiment, the iris scanning device 112 is configured to transmit the images of the dependent individual's irides to the exit management system 120, where the exit manager, through the user interface 122, can cause the images to be stored in the database 116 in such a way that they are correlated or linked to the dependent individual's information already stored in the database 116. Therefore, the database 116 essentially stores a "profile" of the dependent individual, including the iris images of the dependent individual and the identifying information of the dependent individual, including, for example, the dependent individual's name, photograph, date of birth, address, etc. However, according to another embodiment of the invention, no images of the dependent individual's irides are captured or stored in the profile of the dependent individual in the database 116, and the profile of the dependent individual only includes the other identifying information relating to the dependent individual as input to the database by the exit manager.

According to some embodiments of the invention, the exit manager establishes that an individual is authorized to accompany the dependent individual exiting the facility. Individuals so authorized will be referred to herein as "authorized custodians." A dependent individual may have more than one authorized custodian. It is within the discretion of the management of the particular facility to establish certain criteria for determining whether an individual is an authorized custodian. For example, where the invention is practiced in a daycare facility (and the dependent individual is a child), the management of the daycare facility may decide that an individual is established as an authorized custodian of a child visiting the daycare facility if the individual is a legal guardian of the child or if the individual has been authorized in a written document signed by a legal guardian of the child naming the individual and the individual presents to the management of the daycare forms of identification sufficient to establish, in the management's discretion, that the individual is, in fact, the individual named in the legal guardian's written authorization. It should be understood that the foregoing example is for illustrative purposes only, and each facility may have different criteria for establishing whether an individual is an authorized custodian of a particular dependent individual. For example, in one embodiment, a person who delivers the dependant to the facility is automatically considered an authorized custodian.

According to one embodiment, once the determination has been made that a particular individual is an authorized custodian of a dependent individual visiting the facility and having a profile in the database 116, the exit manager, through the user interface 122, manages the collection and/or entry of identifying information about the authorized custodian, including, for example, the authorized custodian's name, photograph, date of birth, address, etc. According to some embodiments, the exit management system 120 stores this information in the database 116. The information may be stored as a separate profile for the authorized custodian that is linked or correlated to the particular dependent individual's profile within the database 116, or it may be stored as part of the particular dependent individual's profile in the database 116. In addition, in some embodiments, the authorized custodian's profile may be stored in the database prior to the storage of the associated dependent individual's profile. In that situation, the exit manager would ensure that the dependent individual's profile, when added to the database, was linked to the authorized custodian's profile.

In accordance with some embodiments, high-resolution images of the irides of established authorized custodian(s) for a dependent individual visiting the facility are captured. The iris scanning device 112 is configured to capture the images and transmit those images to the exit management system 120 and/or the database 116. Alternatively, and in accordance with other embodiments, the exit management system 120 may be capable of obtaining iris images of the authorized custodian from another source, for example a public database of iris images. Ultimately, the iris images of the authorized custodian are stored in the database, as set forth in block 204, and are correlated to the profile of the dependent individual, as represented by block 206. A single dependent individual may have multiple authorized custodians, in which case the profile of the dependent individual in the database is linked to multiple profiles associated with the authorized custodians. In some embodiments, and as discussed above with regard to the images of the irides of the dependent individual, the iris images may be presented to the exit manager prior to being stored in the database 116 or may be directly stored in the database 116 to be accessed later by the exit manager and linked to a profile. According to different embodiments, the exit manager may create an entire profile for the authorized custodian, including the iris images and any identifying information regarding the authorized custodian that the facility management determines is relevant, and store the entire profile at one time, or the iris images may be stored in connection with an already existing stored profile, or the iris images may be stored without accompanying information, which may be added later. The order of storage of information and images in the database is not important, and the various operations may be performed in different orders in accordance with different embodiments of the present invention.

When the dependent individual attempts to exit the facility, according to some embodiments, the exit management system 120 is configured to prevent the dependent individual from leaving the facility unless an authorized custodian presents himself and has his identity authenticated by the exit management system 120. In accordance with one embodiment of the present invention, and as set forth in block 208, upon the dependent individual attempting to leave the facility, the iris scanning device 112 captures high-resolution images of the irides of the dependent individual's eyes and transmits the images to the exit management system 120. According to one embodiment, the exit management system 120 comprises an iris recognition mechanism 124 configured to analyze the captured images, search the iris images stored in the database 116, and locate iris images stored in the database 116 that have a pattern matching the captured images. In one embodiment, the iris recognition mechanism 124 is pattern recognition software. As set forth in block 210, and in accordance with certain embodiments, the iris images stored in the database 116 are compared to the captured iris images and a stored set of iris images is located that matches the captured images. In particular, according to one embodiment of the present invention, the iris images stored in the database 116 are compared to the captured iris images by employing the iris recognition mechanism 124, and the iris recognition mechanism 124 is configured to convert each iris image to a digital template and compare the templates in order to locate a match. Indeed, when it is provided herein that two iris images should be compared, or that a match for a particular iris image should be located, it should be appreciated that such language encompasses comparing the iris images as they may be converted into any form (not just comparing the basic high-resolution images) and locating a match by comparing such converted images.

In the event no matching stored images are located, in accordance with one embodiment, the exit management system 120 may return an error message through the user interface 122 in order to alert the exit manager that the individual attempting to leave the facility is not a known dependent individual with a stored profile. The exit manager may then take steps to set up a profile for the dependent individual and the associated authorized custodians. If the search of the database 116 does locate matching stored images, the exit management system 120 determines that the dependent individual attempting to leave the facility is the dependent individual described in the stored profile containing the matching iris images. According to some embodiments, the exit management system 120 accesses the profile in the database 116 containing the matching iris images, and identifies the corresponding profile(s) of the authorized custodian(s) of the dependent individual that are linked to or contained within the dependent individual's profile.

According to embodiments of the present invention where images of the irides of the dependent individual were never stored in the dependent individual's profile in the database 116, no images of the irides of the dependent individual will be captured upon the dependent individual attempting to exit the facility. In accordance with such embodiments, the exit manager will employ alternative methods to locate and access the profile of the dependent individual, including by direct observation and facial recognition. Such embodiments of the present invention may be preferable in a relatively small facility where the management of the facility is intimately familiar with the dependent individuals who visit the facility and it is inconvenient or difficult to obtain images of the irides of the dependent individual. Alternatively, the dependent individual may have or wear an identification credential issued by the facility or otherwise that the exit manager may review, scan and/or input into the user interface 122 in order to locate and access the dependent individual's profile. Through accessing the dependent individual's profile, the exit manager may view the correlated profiles of the authorized custodian(s) of the dependent individual that are linked to or contained within the dependent individual's profile.

Next, in accordance with some embodiments, and as set forth in block 212, images of the irides of an individual presenting himself at the facility and attempting to accompany the dependent individual exiting the facility are captured. According to one embodiment, the iris scanning device 112 captures the images of the irides of the individual presenting himself at the facility and transmits the captured images to the exit management system 120. According to one embodiment, the exit management system 120, utilizing the iris recognition mechanism 124, analyzes the captured images, compares the captured images (or a template generated from the captured images) to the iris images of the authorized custodian(s) of the dependent individual (or templates thereof) by accessing the profiles of the authorized custodian(s) that were previously identified, and determines whether the captured iris images of the individual attempting to accompany the dependent individual match any of the iris images stored in the database 116 in the profiles of the authorized custodian(s) of the dependent individual. Alternatively, and according to another embodiment of the invention, the exit management system 120 may compare the captured images to all stored images in the database 116, rather than just those stored images located in the profiles of the authorized custodians linked to the profile of the dependent individual. According to either of the foregoing embodiments, and as set forth in block 214, stored images in the database are located that match, based on the determination of the iris recognition mechanism 124, the captured images. After locating a match in the database 116, and as represented by block 216, the exit management system 120 would verify that the located stored images are correlated in the database 116 to the stored images that match the captured images of the dependent individual leaving the facility, as located prior. Alternatively, the exit management system 120 may confirm that the located profile containing the matching stored images is correlated to the profile of the dependent individual exiting the facility (whose profile has already been accessed as discussed above).

In the event the exit management system 120 determines that the captured images match the images stored in the profile of an authorized custodian of the dependent individual, then the exit management system 120 determines that the individual presenting himself at the facility and attempting to accompany the dependent individual is in fact an authorized custodian of the dependent individual and allows the dependent individual to leave the facility in the company of the authorized custodian. On the other hand, if the exit management system 120 does not locate a match for the captured iris images that is included in the set of iris images of authorized custodians stored in the database 116 and linked to the dependent individual's profile, then the exit management system 120, according to some embodiments, does not allow the dependent individual to leave the facility and returns an error message to the exit manager so that the exit manager can take action to resolve the problem, whether by allowing the individual to become an established authorized custodian within the exit management system 120 by complying with the facility's criteria (as determined in the facility's sole discretion), by contacting an authorized custodian of the dependent individual or local authorities, by preventing exit of the dependent individual until an authorized custodian having a profile in the database appears in person to accompany the dependent individual, or otherwise.

In accordance with other embodiments of the present invention, should the dependent individual attempt to exit the facility without the company of an authorized custodian, the iris scanning device 112 captures an image of the irides of the dependent individual and the exit management system 120 locates the profile for the dependent individual using the iris recognition mechanism 124. However, as there is no other individual to scan using the iris scanning device 112, the exit management system 120 is configured to return an error message and/or initiate an alarm signaling that a dependent individual is attempting to exit the facility without an authorized custodian. Once the exit manager is alerted of the attempted unauthorized exit, the exit manager may address the situation in accordance with the particular facility's established policies and procedures.

It should be appreciated that the order of the procedure as described hereinabove may vary in accordance with different embodiments of the invention. For example, the iris scanning device 112 may capture the images of the irides of the individual attempting to accompany the dependent individual prior to capturing the images of the irides of the dependent individual, and the profile of the authorized individual may be located and/or accessed prior to locating or accessing the profile of the dependent individual. In that case, the exit management system 120 would be configured to utilize the link established within the database 116 between the stored profile of the authorized individual and the profile of the dependent individual to identify the dependent individual associated with the identified authorized individual. According to some embodiments, images of the irides of both the dependent individual exiting the facility and the individual attempting to accompany the dependent individual are captured and compared to all or a portion of the iris images stored in the database 116. The dependent individual is allowed to leave the facility only if both the set of captured iris images of the dependent individual and the set of captured iris images of the individual attempting to accompany the dependent individual have matching stored sets of iris images in the database 116, and the stored set of iris images that match the set of captured iris images of the presenting accompanying individual are located in the profile of an authorized custodian that is linked within the database 116 to the dependent individual profile containing the set of stored iris images matching the set of captured iris images of the dependent individual seeking to exit the facility.

According to some embodiments of the present invention, the exit management system 120 is also configured to manage entry of dependent individuals that are repeat visitors of the facility. In accordance with one embodiment, a dependent individual presents himself for entry at the facility. The iris scanning device 112 captures high-resolution images of the irides of the dependent individual prior to allowing the dependent individual to enter the facility. The exit management system 120 is configured to analyze the captured iris images and compare the captured iris images to the iris images of known dependent individuals stored in the database 116 using the iris recognition mechanism 124. If a matching set of stored iris images is located and relates to the profile of a dependent individual having an active account within the facility, the exit management system 120 is configured to allow entry to the dependent individual. On the other hand, if no matching set of images is located, or if a matching set of images is located but relates to a profile containing problematic information (as determined by management of the facility), entry to the facility is refused and an error message is returned to the exit manager through the user interface 122 so that the exit manager may address the missing profile in accordance with the facility's particular policies and designated processes.

At the time of entry, according to one embodiment, the iris scanning device 112 may also capture high-resolution images of the irides of an individual accompanying the dependent individual seeking to enter the facility. As described herein, the captured images may be analyzed and compared to the images stored in the database 116 in order to locate a match. In the event the exit management system 120 is unable to locate a matching set of stored images in the profile of an authorized custodian that is linked to the profile of the particular dependent individual seeking entry to the facility (as identified using the iris recognition mechanism 124), then the exit management system 120 will record this discrepancy, allow the dependent individual to enter the facility, and present a message to the exit manager so that the exit manager can determine whether the individual accompanying the dependent individual should be a recognized authorized custodian for that dependent individual, in which case the exit manager could begin the process of creating a profile for the authorized custodian to be stored in the database 116 and linked to the dependent individual's profile. Alternatively, the facility may determine that the dependent individual should not be allowed to enter the facility under such circumstances, in which case the exit management system 120 will deny entry. Indeed, the manner in which the facility chooses to address a failure of the exit management system 120 to locate a match is entirely within the discretion of the management of the facility.

It should be appreciated that the components of the system described herein are capable of performing additional functions that are beneficial to the identity authentication process. For example, and as discussed above, according to some embodiments, profiles are initially created and stored in the database 116 for each dependent individual visiting the facility and each authorized custodian authorized to accompany the dependent individual when entering and/or exiting the facility. These profiles contain the iris images of the particular individual, as well as other identifying and relevant information as determined by the management of the facility. According to an embodiment of the invention, the other information is manually entered into the database 116 and added to the particular individual's profile by the exit manager. In accordance with one embodiment, the iris scanning device 112 is configured to take photographs of the dependent individuals and authorized custodians that may be stored in connection with the iris images in the applicable profiles in the database 116 by the exit management system 120. According to another embodiment, the exit management system 120 comprises an identification scanning mechanism configured to read, copy or scan identification credentials provided by the dependent individual or the authorized custodian, and the exit management system 120 may be further configured to store the identifying data obtained from reading, copying or scanning the identification credentials in the appropriate profile in the database 116. Alternatively, and according to yet another embodiment of the invention, the exit management system 120 may be capable of accessing an outside catalog of iris images created and maintained by a third party in order to locate a match for the captured iris images of an individual. In that case, if a match were located, the exit management system could automatically populate the individual's profile with the identifying information associated with the matching iris images in the outside catalog. As this process is automated, it would avoid the need for manual entry of at least some data, although the exit manager may confirm that the populated data is consistent with forms of identification provided by the individual in person.

In addition, according to some embodiments of the present invention, the iris scanning device 112 is further configured to record the date and time at which each iris image was captured and according to other embodiments, the exit management system 120 is configured to record the date and time at which the dependent individual is actually granted or denied entry or exit. This data may be transmitted with the iris images and stored in the database 116 such that a "visitation log" is contained in or related to each stored profile, detailing the visits that the particular dependent individual or authorized custodian makes to the facility. This log may date back as long as the exit manager determines, and the exit management system 120 may be configured to delete from the database 116 data relating to visits logged a certain amount of time in the past. The visitation log is advantageous as it allows the exit manager to quickly verify whether a particular dependent individual is currently visiting the facility. Furthermore, the visitation log could be used for other purposes, such as determining the number hours the dependent individual spent at the facility in a given period and/or the particular days the dependent individual visited the facility for billing purposes, if the facility charges for visits. Indeed, in accordance with one embodiment, a debit card, account number, or other payment mechanism may be included in the profile of the dependent individual or the authorized custodian and may be automatically charged at predetermined times based on the data included in the visitation log.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computer-implemented method for authenticating an identity of an authorized custodian of a dependent individual visiting a facility, the method comprising:
   providing a non-transitory computer-readable medium comprising computer program code stored thereon, wherein said computer program code is specifically configured to cause one or more computer processing devices to perform one or more of the following operations when performing the computer program code:
   establishing a first profile comprising an image of the dependent individual and an image of an iris of the dependent individual;
   establishing a second profile comprising an image of the authorized custodian of the dependent individual and an image of an iris of the authorized custodian, wherein establishing the second profile comprises:
      accessing an external catalog comprising a plurality of iris images and identifying information about an individual associated with each of the plurality of iris images, wherein the external catalog is maintained by a third party;
      comparing the image of the iris of the authorized custodian to the plurality of iris images in the external catalog;
      identifying a match between the image of the iris of the authorized custodian and, at least, one of the plurality of iris images in the external catalog;
      receiving identifying information associated with the authorized custodian based of the identifying a match; and
      automatically populating the second profile of the authorized custodian with the identifying information associated with the authorized custodian from the external catalog based at least partially on the receiving identifying information;
   storing in a database the first profile of the dependent individual and the second profile of the authorized custodian of the dependent individual, where the second profile of the authorized custodian is associated with the first profile in the database;
   capturing an image of an iris of an individual attempting to accompany the dependent individual when the dependent individual exits the facility; and
   verifying, prior to allowing the dependent individual to exit the facility, that the individual attempting to accompany the dependent individual is the authorized custodian of the dependent individual, wherein verifying comprises:
      matching the captured image of the iris of the individual attempting to accompany the dependent individual to an image of an iris stored in the database;
      locating the second profile of the authorized custodian based at least partially on the matching; and
      determining whether the located second profile of the authorized custodian is associated with the first profile of the dependent individual in the database.

2. The computer-implemented method of claim 1, further comprising computer program code specifically configured to cause one or more computer processing devices to perform the following operations when performing the computer program code:
   utilizing an iris recognition mechanism configured to locate in the database a recorded image of an iris that matches a captured image of an iris.

3. The computer-implemented method of claim 1, wherein verifying that the captured image of the iris of the individual attempting to accompany the dependent individual when the dependent individual exits the facility matches the recorded image of the iris of the authorized custodian comprises:
   locating in the database a recorded image of an iris that matches the captured image of the iris of the individual attempting to accompany the dependent individual; and
   confirming that the located recorded image is correlated to a profile of the dependent individual stored in the database.

4. The computer-implemented method of claim 1, further comprising computer program code specifically configured to cause one or more computer processing devices to perform one or more of the following operations when performing the computer program code:
   recording an image of an iris of the dependent individual;
   correlating the recorded image of the iris of the dependent individual to the recorded image of the authorized custodian;
   capturing an image of the iris of the dependent individual prior to allowing the dependent individual to exit the facility; and
   locating in the database a recorded image of an iris that matches the captured image of the iris of the dependent individual.

5. The computer-implemented method of claim 4, wherein verifying that the captured image of the iris of the individual attempting to accompany the dependent individual when the dependent individual exits the facility matches the recorded image of the iris of the authorized custodian comprises:
   locating in the database a recorded image of an iris that matches the captured image of the iris of the individual attempting to accompany the dependent individual; and
   confirming that the located recorded image of an iris that matches the captured image of the iris of the individual attempting to accompany the dependent individual is correlated to the located recorded image of an iris that matches the captured image of the iris of the dependent individual.

6. The computer-implemented method of claim 1, further comprising computer program code specifically configured to cause one or more computer processing devices to perform the following operations when performing the computer program code:
   storing a profile of the dependent individual in the database; and
   correlating the recorded image of the iris of the authorized custodian to the profile of the dependent individual.

7. The computer-implemented method of claim 6, wherein the profile of the dependent individual comprises a recorded image of an iris of the dependent individual.

8. The computer-implemented method of claim 7, further comprising computer program code specifically configured to cause one or more computer processing devices to perform the following operations when performing the computer program code:
   capturing an image of the iris of the dependent individual prior to allowing the dependent individual to exit the facility;
   locating in the database a recorded image that matches the captured image of the iris of the dependent individual; and
   confirming that the located recorded image is the recorded image of an iris of the dependent individual contained in the profile of the dependent individual stored in the database and correlated to the recorded image of the iris of the authorized custodian.

9. A computer-implemented method for preventing a dependent individual attempting to exit a facility from exiting the facility, the method comprising:
   providing a non-transitory computer-readable medium comprising computer program code stored thereon, wherein said computer program code is specifically configured to cause one or more computer processing devices to perform one or more of the following operations when performing the computer program code:
   establishing a first profile comprising an image of the dependent individual and an image of an iris of the dependent individual;
   establishing a second profile comprising an image of the authorized custodian of the dependent individual and an image of an iris of the authorized custodian, wherein establishing the second profile comprises:
      accessing an external catalog comprising a plurality of iris images and identifying information about an individual associated with each of the plurality of iris images, wherein the external catalog is maintained by a third party;
      comparing the image of the iris of the authorized custodian to the plurality of iris images in the external catalog;
      identifying a match between the image of the iris of the authorized custodian and, at least, one of the plurality of iris images in the external catalog;
      receiving identifying information associated with the authorized custodian based of the identifying a match; and
      automatically populating the second profile of the authorized custodian with the identifying information associated with the authorized custodian from the external catalog based at least partially on the receiving identifying information;
   storing in a database the first profile of the dependent individual and the second profile of an authorized custodian of the dependent individual, where the image of the iris of the dependent individual and the image of the iris of the authorized custodian are linked in such a way to correlate the first profile of the dependent individual and the second profile authorized custodian;
   capturing an image of the iris of the dependent individual when the dependent individual attempts to exit the facility;
   locating in the database a recorded image of an iris that matches the captured image of the iris of the dependent individual; and
   preventing the dependent individual from exiting the facility when it has not been verified that the authorized custodian is accompanying the dependent individual or when an individual accompanying the dependent has not been verified, wherein verifying comprises:
      matching a captured image of an iris of the individual attempting to accompany the dependent individual to an image of an iris stored in the database;
      locating the second profile of the authorized custodian based at least partially on the matching; and
      determining whether the located second profile of the authorized custodian is correlated with the first profile of the dependent individual.

10. The computer-implemented method of claim 9, further comprising computer program code specifically configured to cause one or more computer processing devices to perform one or more of the following operations when performing the computer program code:
   capturing an image of an iris of an individual attempting to accompany the dependent individual attempting to exit the facility;
   locating in the database a recorded image of an iris that matches the captured image of the iris of the individual attempting to accompany the dependent individual; and
   determining that the located recorded image of an iris that matches the captured image of the iris of the individual attempting to accompany the dependent individual is not correlated to the located recorded image of an iris that matches the captured image of the iris of the dependent individual.

11. The computer-implemented method of claim 9, further comprising computer program code specifically configured to cause one or more computer processing devices to perform one or more of the following operations when performing the computer program code:
   determining that the dependent individual is not accompanied by the authorized custodian.

12. The computer-implemented method of claim 11, wherein determining that the dependent individual is not accompanied by the authorized custodian comprises:
   failing to capture an image of an individual attempting to accompany the dependent individual attempting to exit the facility.

13. A system for authenticating the identity of an authorized custodian of a dependent individual visiting a facility, the system comprising:
   a non-transitory computer-readable medium comprising computer program code stored thereon, wherein said computer program code is specifically configured to cause one or more computer processing devices to perform one or more operations when performing the computer program code;
   a computer processing device;

an iris scanning device configured to capture at least one image of an individual's iris;

a database in communication with an exit management system and configured to:

establish a first profile comprising an image of the dependent individual and an image of an iris of the dependent individual;

establish a second profile comprising an image of the authorized custodian of the dependent individual and an image of an iris of the authorized custodian, wherein establishing the second profile comprises:

accessing an external catalog comprising a plurality of iris images and identifying information about an individual associated with each of the plurality of iris images, wherein the external catalog is maintained by a third party;

comparing the image of the iris of the authorized custodian to the plurality of iris images in the external catalog;

identifying a match between the image of the iris of the authorized custodian and, at least, one of the plurality of iris images in the external catalog;

receiving identifying information associated with the authorized custodian based of the identifying a match; and automatically populating the second profile of the authorized custodian with the identifying information associated with the authorized custodian from the external catalog based at least partially on the receiving identifying information;

store in the database the first profile of the dependent individual and the second profile of the authorized custodian of the dependent individual, where the second profile of the authorized custodian is associated with the first profile in the database;

the exit management system in communication with the computer processing device and the iris scanning device, wherein the exit management system comprises an iris recognition mechanism, wherein the exit management system is configured to use the computer processing device to execute the computer program code to cause the computer processing device to verify the at least one image of the individual's iris by:

matching the at least one image of the individual's iris to an image of an iris stored in the database;

locating the second profile of the authorized custodian based at least partially on the matching; and determining whether the located second profile of the authorized custodian is associated with the first profile of the dependent individual in the database.

14. The system of claim 13, wherein the exit management system further comprises a user interface that allows a user to access the database and store data in the database.

15. The system of claim 13, wherein the iris scanning device comprises an imaging device configured to capture high-resolution images of the irides of an individual's eyes.

16. The system of claim 13, wherein the iris scanning device is further configured to take a photograph of an individual showing the entire face of the individual.

17. The system of claim 13, wherein the iris scanning device is in communication with the database and is configured to transmit the images that it captures to the exit management system or the database.

18. The system of claim 13, wherein the exit management system is configured to store in the database the images captured by the iris scanning device.

19. The system of claim 13, wherein the exit management system is configured to correlate an image of an iris of the authorized custodian to an image of an iris of the dependent individual.

20. The system of claim 13, wherein the exit management system is configured to compare a captured image of an iris of an individual attempting to accompany the dependent individual exiting the facility to images stored in the database.

21. A computer program product for authenticating the identity of an authorized custodian of a dependent individual visiting a facility, the computer program product comprising a non-transitory computer readable medium having computer readable program instructions stored therein, wherein said computer readable program instructions comprise:

instructions configured for establishing a first profile comprising an image of the dependent individual and an image of an iris of the dependent individual;

instructions configured for establishing a second profile comprising an image of the authorized custodian of the dependent individual and an image of an iris of the authorized custodian, wherein establishing the second profile comprises:

accessing an external catalog comprising a plurality of iris images and identifying information about an individual associated with each of the plurality of iris images, wherein the external catalog is maintained by a third party;

comparing the image of the iris of the authorized custodian to the plurality of iris images in the external catalog;

identifying a match between the image of the iris of the authorized custodian and, at least, one of the plurality of iris images in the external catalog;

receiving identifying information associated with the authorized custodian based of the identifying a match; and automatically populating the second profile of the authorized custodian with the identifying information associated with the authorized custodian from the external catalog based at least partially on the receiving identifying information;

instructions configured for storing in a database the first profile of the dependent individual and the second profile of the authorized custodian of the dependent individual, where the second profile of the authorized custodian is associated with the first profile in the database;

instructions configured for capturing an image of an iris of an individual attempting to accompany the dependent individual; and instructions configured for verifying the individual as an authorized custodian of the dependent individual, wherein verifying the individual comprises:

matching the captured image of the iris of the individual attempting to accompany the dependent individual to an image of an iris stored in the database;

locating the second profile of the authorized custodian based at least partially on the matching; and determining whether the located second profile of the authorized custodian is associated with the first profile of the dependent individual in the database.

22. The computer program product of claim 21, further comprising:

instructions configured for locating a recorded image in the database that matches the captured image of the iris of the individual attempting to accompany the dependent individual.

23. The computer program product of claim 21, further comprising:

instructions configured for verifying that the located recorded image in the database is correlated to the recorded image of the iris of the dependent individual.

24. The computer program product of claim 21, further comprising:

instructions configured for utilizing an iris recognition mechanism.

\* \* \* \* \*